United States Patent
Lin et al.

(10) Patent No.: US 11,018,591 B1
(45) Date of Patent: May 25, 2021

(54) DYNAMIC REGULATION POWER CONTROLLER

(71) Applicant: INNO-TECH CO., LTD., Taipei (TW)

(72) Inventors: Chih-Feng Lin, Taipei (TW); Shu-Chia Lin, Taipei (TW); Tsu-Huai Chan, Taipei (TW)

(73) Assignee: INNO-TECH CO., LTD., Taipei (TW)

( * ) Notice: Subject to any disclaimer, the term of this patent is extended or adjusted under 35 U.S.C. 154(b) by 11 days.

(21) Appl. No.: 16/749,177

(22) Filed: Jan. 22, 2020

(30) Foreign Application Priority Data

Dec. 10, 2019 (TW) .................................. 108145139

(51) Int. Cl.
  *H02M 3/335* (2006.01)
  *H02M 1/44* (2007.01)
  *H02M 1/08* (2006.01)
  *H02M 1/00* (2006.01)

(52) U.S. Cl.
  CPC ......... *H02M 3/33523* (2013.01); *H02M 1/08* (2013.01); *H02M 1/44* (2013.01); *H02M 2001/0009* (2013.01)

(58) Field of Classification Search
  CPC ...... H02M 3/33523; H02M 1/44; H02M 1/08; H02M 2001/0009
  See application file for complete search history.

(56) References Cited

U.S. PATENT DOCUMENTS

| | | | |
|---|---|---|---|
| 2015/0295496 A1* | 10/2015 | Chen | H02M 1/32 363/21.18 |
| 2017/0005583 A1* | 1/2017 | Choi | H02M 3/33553 |
| 2018/0034378 A1* | 2/2018 | Lin | H02M 1/08 |

* cited by examiner

*Primary Examiner* — Kyle J Moody
(74) *Attorney, Agent, or Firm* — Lin & Associates Intellectual Property, Inc.

(57) ABSTRACT

Disclosed is a dynamic regulation power controller having a work voltage input pin, a feedback voltage input pin, a driving voltage output pin, a current sensing input pin, and a regulation power input pin, and being in collocation with a switching unit, an input power processing unit, a transformer, a current sensing resistor, a power regulation unit, an output rectification unit, and an output capacitor for converting an input AC voltage into an output voltage for supplying a load. In particular, the driving voltage and the driving current are dynamically adjusted according to the feedback voltage and the current sensing signal, thereby greatly increasing efficiency of power conversion and Electromagnetic Interference (EMI).

5 Claims, 4 Drawing Sheets

DYNAMIC REGULATION POWER CONTROLLER

CROSS-REFERENCE TO RELATED APPLICATION

This application claims the priority of Taiwanese patent application No. 108145139, filed on Dec. 10, 2019, which is incorporated herewith by reference.

BACKGROUND OF THE INVENTION

1. Field of the Invention

The present invention relates to a power controller, and more specifically to a dynamic regulation power controller employing the feedback voltage to perform a dynamic regulation process to generate and dynamically adjust the driving voltage and the driving current according to the feedback voltage and the current sensing signal so as to convert an input AC voltage into an output voltage for supplying a load, thereby greatly increasing efficiency of power conversion and improving the effect of Electromagnetic Interference (EMI).

2. The Prior Arts

As electronic devices become more popular, the power conversion technology has been more important because each electronic device usually needs a specific supply power with different voltage or current. For instance, an integrated circuit (IC) is design to operate at 5V or 3V, an electric motor usually needs a DC power like 12V, and a lamp of a liquid crystal display only works at even higher voltage like 150V. Thus, various power converters have been developed to meet actual applications.

In the prior arts, the switching power conversion technology is commonly used in the current electronic industry, and primarily employs a Pulse Width Modulation signal with a high frequency to drive a switch unit (or called as a driving transistor) to turn on/off so as to control the voltage of the coil (or a transformer) connected to the switch unit. Owing to the intrinsic feature the coil, that is, sustaining the current without abrupt change, the current flowing through the switch unit is sustained and not instantly cut off when the switch unit is turned off such that the coil is charged and recharged back and forth, thereby achieving the function of changing the output voltage.

However, one of the shortcomings in the prior arts is that the driving voltage for driving the switch unit and the driving current flowing through the switch unit are not appropriately adjusted according to the input voltage. As a result, the power conversion is optimized for only one specific input voltage to reduce the switching loss and the conduction loss, and fails to covers the whole range of the input voltage. It is difficult of further increasing efficiency of power conversion.

Therefore, it is greatly needed to provide a new dynamic regulation power controller employing the feedback voltage to perform a dynamic regulation process to generate and dynamically adjust the driving voltage and the driving current according to the feedback voltage and the current sensing signal so as to convert an input AC voltage into an output voltage for supplying a load, thereby greatly increasing efficiency of power conversion and improving the effect of Electromagnetic Interference (EMI), and overcoming the problems in the prior arts.

SUMMARY OF THE INVENTION

The primary objective of the present invention is to provide a dynamic regulation power controller having a work voltage input pin, a feedback voltage input pin, a driving voltage output pin, a current sensing input pin, and a regulation power input pin, and further in collocation with a switching unit, an input power processing unit, a transformer, a current sensing resistor, a power regulation unit, an output rectification unit, and an output capacitor for converting an input AC voltage into an output voltage for supplying a load. The driving voltage and the driving current are generated and controlled through a dynamic regulation process according to an input AC voltage and a feedback voltage so as to for convert the input AC voltage into the output voltage.

Specifically, the work voltage input pin receives the work voltage for the dynamic regulation power controller to operate. the feedback voltage input pin receives the feedback voltage for the dynamic regulation process, and the driving voltage output pin is configured to send the driving voltage for driving the switch unit. In addition, the current sensing input pin receives the current sensing signal, and the regulation power input pin receives the input regulation power.

Further, the input power processing unit receives the input AC voltage and performs a filter process to generate an input voltage, and the input voltage is regulated to generate the working voltage. The power regulation unit is connected to the input power processing unit and the regulation power input pin for regulating the input voltage into the input regulation power.

The above transformer comprises a primary side coil and a secondary side coil, and a conduction current and a sensing current flowing through the primary side coil and the secondary side coil, respectively. The sensing current is generated by the secondary side coil through electromagnetic interaction with the conduction current. The secondary side coil, the output rectification unit, and the output capacitor are sequentially connected in series, a load connected in parallel to the output capacitor. Additionally, the sensing current flows from the secondary side coil to the output capacitor and the load connected in parallel through the output rectification unit, and the output capacitor generates an output power to supply the load.

In particular, the feedback voltage is generated by a primary side feedback circuit or a secondary side feedback circuit, and corresponds to the input AC voltage or the output power, wherein the primary side feedback circuit is connected to the input AC voltage and the feedback voltage pin, and the secondary side feedback circuit is connected to the output power and the feedback voltage pin. The input power processing unit, the primary side coil, the switching unit, and the current sensing resistor are sequentially connected in series between the input AC voltage and a ground level.

More specifically, the driving voltage is implemented by a Pulse Width Modulation (PWM) pulse wave provided with a specific frequency.

Moreover, the dynamic regulation process comprises the steps S10, S20, S30, S40, S50, S60, and S70, which are related to a first period of time, a second period of time, a third period of time, a fourth period of time, a fifth period of time, a sixth period of time, a seventh period of time, respectively.

The a step S10 is performed by linearly increasing the driving voltage from 0V to a conduction voltage during the first period of time, the conduction voltage being larger than a threshold voltage of the switch unit and close to a Miller plateau voltage of the switch unit, the switch unit being turned on in case of the driving voltage greater than the threshold voltage, gradually increasing the driving current flowing through the switch unit from 0 A to a maximum driving current as the driving voltage being increased, the maximum driving current adjusted according to the feedback voltage.

In the step S20, the dynamic regulation process keeps the driving voltage at the conduction voltage and keeps the driving current at the maximum driving current during the second period of time.

The step S30 is then executed by, increasing the driving voltage from the conduction voltage to a high level voltage and keeping the driving current at the maximum driving current during the third period of time, the high level voltage being set to increase as the feedback voltage increasing.

In the step S40, the dynamic regulation process keeps the driving voltage at the high level voltage, and keeps the driving current at the maximum driving current during the fourth period of time.

In step S50, the dynamic regulation process decreases the driving voltage from the high level voltage to the conduction voltage, and keeps the driving current at the maximum driving current during the fifth period of time.

Next, the step S60 is performed by decreasing the driving voltage from the conduction voltage to 0V during a sixth period of time, the switch unit being turned off and the driving current being decreased to 0 A when the driving voltage less than the threshold voltage.

Subsequently, the step S70 is performed by keeping the driving voltage to 0V to maintain the switch unit turned off, and keeping the driving current to 0 A during a seventh period of time, and then returning back to the step 10 to implement a PWM control.

In brief, the present invention employs the feedback voltage to perform the dynamic regulation process, which generates and controls the driving voltage and the driving current, and then converts the input AC voltage into the output voltage for supplying the load. Thus, efficiency of power conversion is greatly increased and the effect of EMI is improved.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
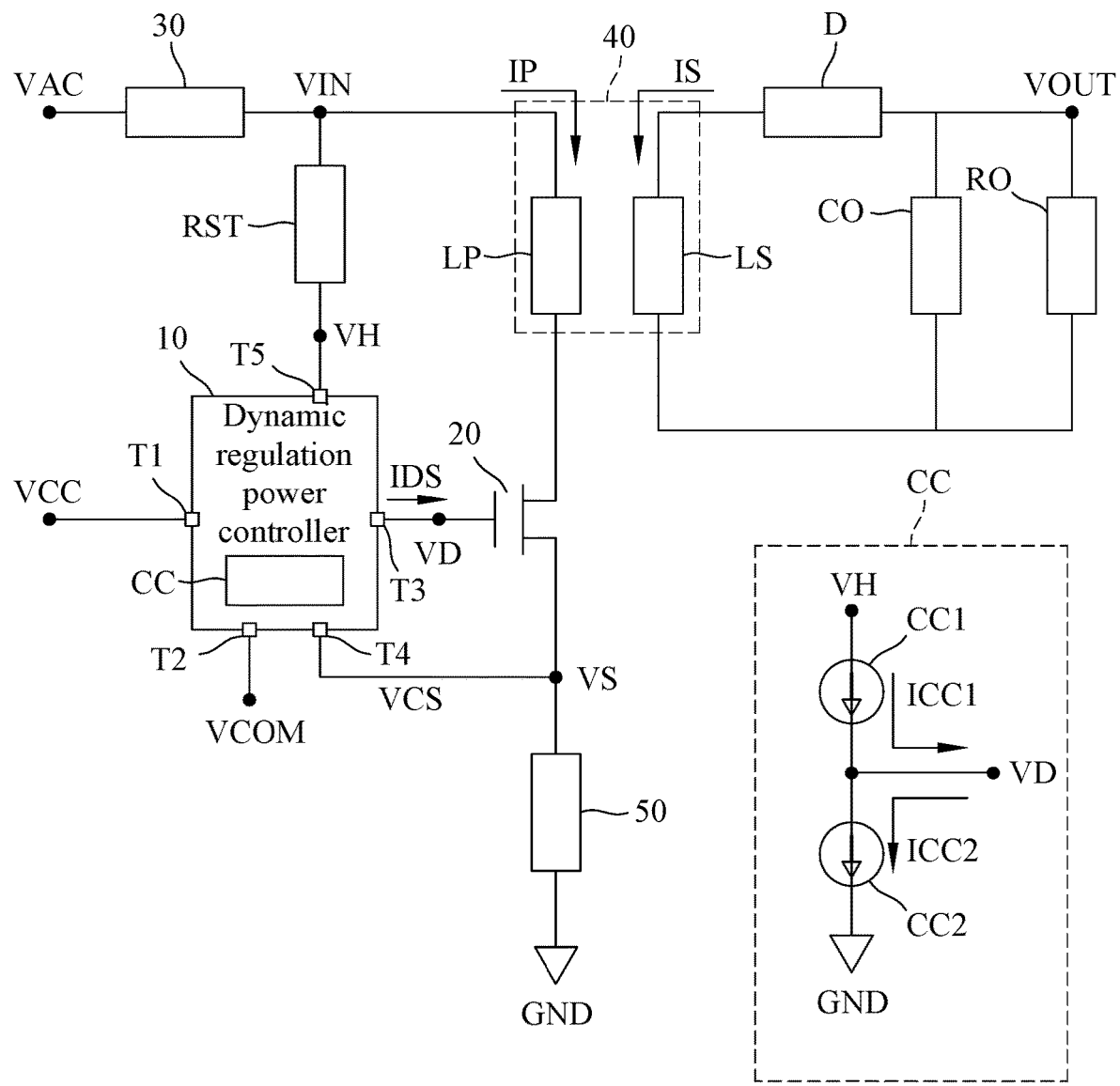
FIG. 1 shows a view of the dynamic regulation power controller according to the embodiment of the present invention.

Please refer to FIG. 1 illustrating the dynamic regulation power controller according to the embodiment of the present invention. As shown in FIG. 1, the dynamic regulation power controller 10 of the present invention comprises a work voltage input pin T1, a feedback voltage input pin T2, a driving voltage output pin T3, a current sensing input pin T4, and a regulation power input pin T5, and is collocation with a switching unit 20, an input power processing unit 30, a transformer 40, a current sensing resistor 50, a power regulation unit RST, an output rectification unit D, and an output capacitor CO for performing a dynamic regulation process based on a feedback voltage VCOM to generate a driving voltage VD and convert an input alternative current (AC) voltage VAC into an output voltage VOUT to supply a load RO, thereby greatly reducing switching loss and Electromagnetic Interference (EMI). In particular, the dynamic regulation power controller 10 employs the input AC voltage VAC and an output loading state corresponding to the feedback voltage VCOM to dynamically adjust the driving current IDS for the driving voltage VD flowing through the driving voltage output pin T3 to the switching unit 20.

For instance, the input AC voltage VAC is 90-264 Vac such as 90 Vac, 115 Vax, 230 Vax, or 264 Vac.

Specifically, the work voltage input pin T1 and the feedback voltage input pin T2 of the dynamic regulation power controller 10 are employed to receive the work voltage VCC and the feedback voltage VCOM, respectively, the driving voltage output pin T3 sends the driving voltage VD, the current sensing input pin T4 receives a current sensing signal VCS, and the regulation power input pin T5 receives an input regulation power VH.

Substantially, the switch unit 20 is implemented by a Metal-Oxide-Semiconductor (MOS) element or a bipolar element. For clear description of the aspects of the present invention, only the illustrative example provided with a MOS element as the switch unit 20 is shown. Thus, the driving voltage output pin T3 of the dynamic regulation power controller 10 is connected to a gate of the MOS element. However, in case of a bipolar element as the switch unit 20, the driving voltage output pin T3 is connected to a base of the bipolar element.

Further, the input power processing unit 30 receives the input AC voltage VAC and generates an input voltage VIN through a filter process, and the input voltage VIN is regulated to generate a work voltage VCC to supply the dynamic regulation power controller 10 to operate. Additionally, the transformer 40 comprises a primary side coil LP and a secondary side coil LS, and a conduction current IP and a sensing current IS flows through the primary side coil LP and the secondary side coil LS, respectively.

More specifically, between the input AC voltage VAC and the ground level GND, the input power processing unit 30, the primary side coil LP, the switching unit 20, and the current sensing resistor 50 are sequentially connected in series, and a current sensing signal VCS is generated at a connection point of the switching unit 20 and the current sensing resistor 50.

In addition, the input voltage VIN from the input power processing unit 30 is transferred to, the primary side coil LP, the primary side coil LP is further connected to a drain of the switching unit 20, and a source of the switching unit 20 is connected to the ground level GND. Further, the secondary side coil LS is connected to the output rectification unit D and the output capacitor CO, and the load RO is connected in parallel to the output capacitor CO.

Specifically, the driving voltage VD generated by the dynamic regulation power controller 10 is substantially a Pulse Width Modulation (PWM) pulse wave provided with a frequency, which is adjustable. For example, the frequency is 20 KHz-1 MHz. Thus, the dynamic regulation power controller 10 employs the driving voltage VD to control the gate to turn on or off the switching unit 20. When the switching unit 20 is turned on, the conduction current IP flows through the switching unit 20, and when the switching unit 20 is turned off, the conduction current IP stops flowing or is cut off.

The above conduction current IP induces the sensing current IS through electromagnetic interaction, and because the secondary side coil LS, the output rectification unit D and the output capacitor CO are sequentially connected in series, the sensing current IS flows through the primary side coil LP and the output rectification unit D to the output capacitor CO and the load RO connected in parallel. Thus, the output capacitor CO generates an output power VOUT to supply the load RO.

The feedback voltage VCOM is intended to correspond to the input AC voltage VAC or the output power VOUT through a specific circuit such as a primary side feedback circuit or a secondary side feedback circuit (not shown). That is, the feedback voltage VCOM is generated by the primary side feedback circuit or the secondary side feedback circuit, wherein the primary side feedback circuit is connected to the input AC voltage VAC and the feedback voltage input pin T2, and the secondary side feedback circuit is connected to the output power VOUT and the feedback voltage input pin T2, For example, the transformer 40 can be further provided with an additional auxiliary coil, which is employed as the primary side feedback circuit to generate the feedback voltage VCOM corresponding to the input AC voltage VAC through the conduction current IP, and the output power VOUT can be obtained through appropriate calculation. Or alternatively, an isolation unit (not shown) comprising a photo coupler and a photo diode is additionally provided between the feedback voltage VCOM and the output power VOUT and employed as the secondary side feedback circuit. Thus, the feedback voltage VCOM corresponds to the output power VOUT, and the input AC voltage VAC can be obtained through appropriate calculation.

In summary, the dynamic regulation power controller 10 of the present invention is applicable to the primary side feedback circuit and the secondary side feedback circuit for power conversion.

In addition, the power regulation unit RST is connected between the input power processing unit 30 and the regulation power input pin T5 for regulating the input voltage VIN to generate the input regulation power VH. For instance, the power regulation unit RST comprises two voltage divider resistors, a rectification diode, and a filter capacitor. Because the above power regulation unit RST is well known in the prior arts, the related aspect is not described in detail hereinafter.

Further, the dynamic regulation power controller 10 comprises a current source CC, which is employed to dynamically control the driving current IDS for the driving voltage VD based on the input AC voltage VAC and the feedback voltage VCOM through a constant current driving manner. For example, the current source CC comprises a first current source CC1 and a second current source CC2 connected in series between the regulation power input pin T5 and the ground level GND. The current source CC receives the input regulation power VH from the regulation power input pin T5, and a connection point of the first current source CC1 and the second current source CC2 is connected to the driving voltage output pin T3. The first current source CC1 supplies a first constant current ICC1, and the second current source CC2 supplies a second constant current ICC2, wherein the first constant current ICC1 flows from the input regulation power VH to the switch unit 20, and the second constant current ICC2 flows from the switch unit 20 to the ground level GND.

Since the first current source CC1 and the second current source CC2 are well known in the prior arts, the related aspect is not described in detail hereinafter. It should be noted the above current source CC is substantially intended to cover all kinds of current source circuits.

Figure 2:
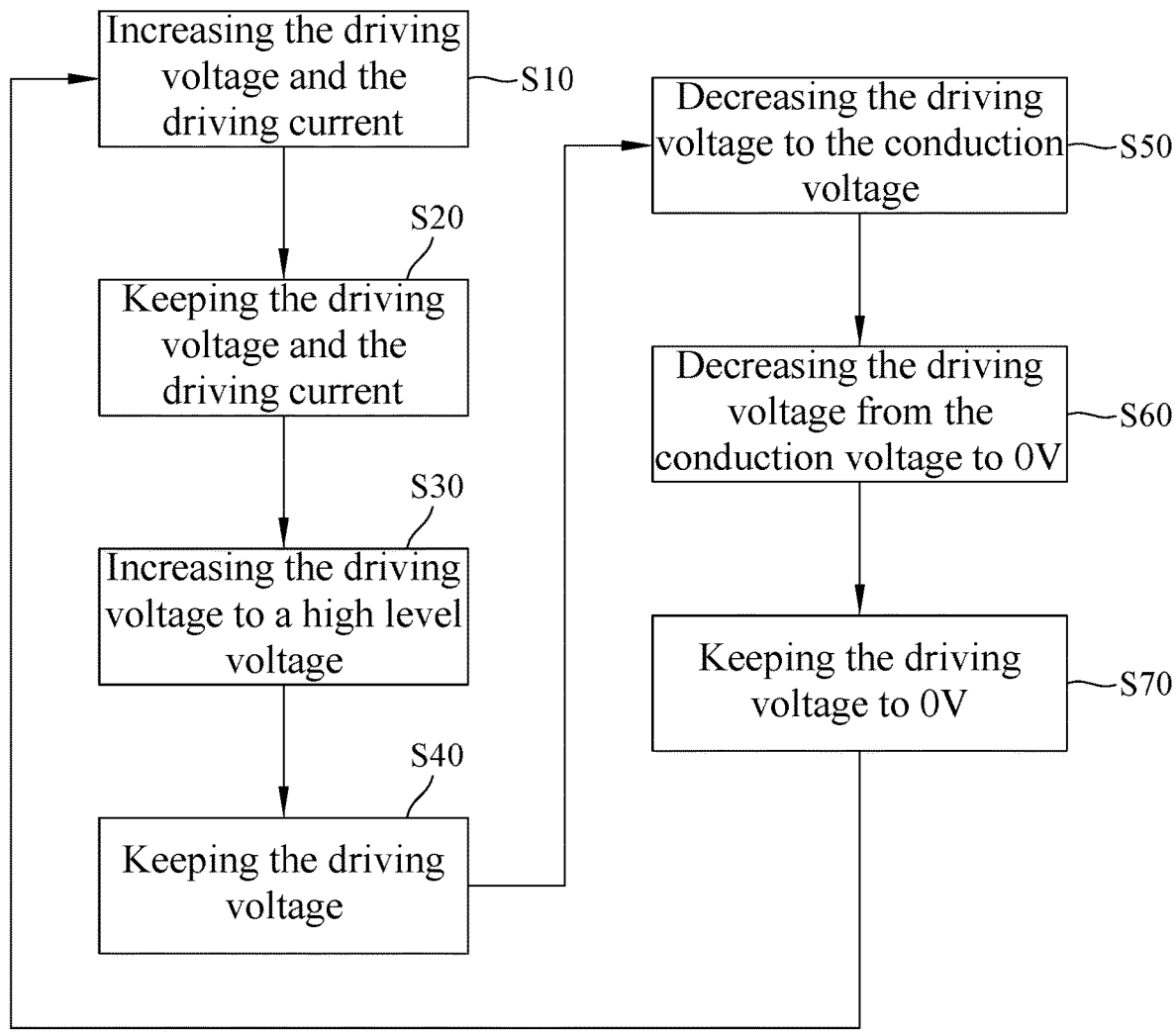
FIG. 2 shows a flowchart of the dynamic regulation process performed by the dynamic regulation power controller according to the embodiment of the present invention.
Figure 3:
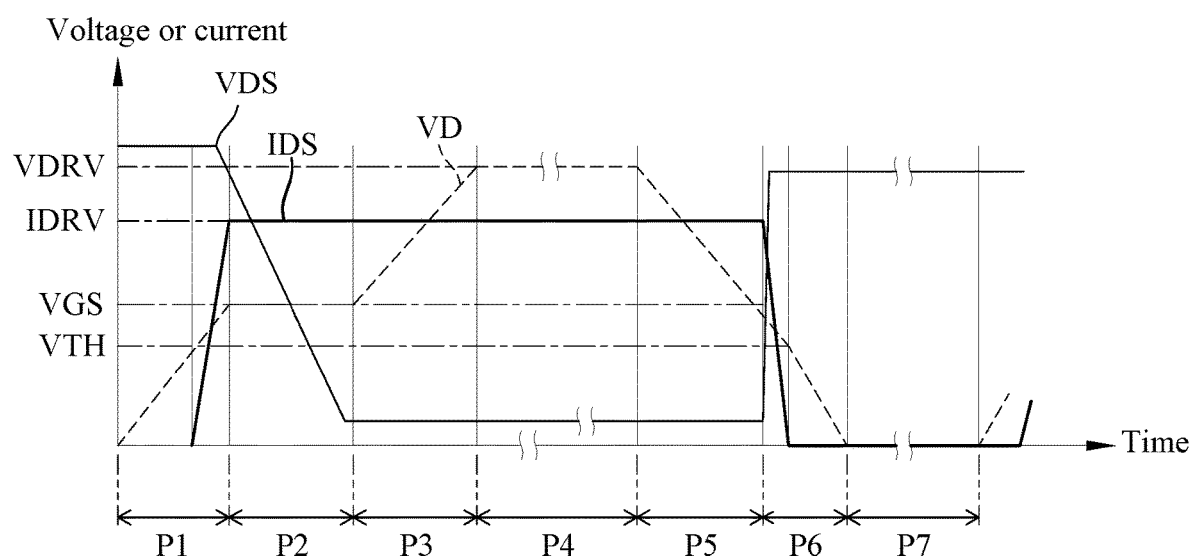
FIG. 3 shows an operation waveform of the dynamic regulation process performed by the dynamic regulation power controller according to the embodiment of the present invention.

Additionally refer to FIGS. 2 and 3 illustrating a flowchart and an operation waveform of the dynamic regulation process performed by the dynamic regulation power controller 10 according to the embodiment of the present invention, respectively, As shown in FIGS. 2 and 3, the dynamic regulation process comprises the steps S10, S20, S30, S40, S50, S60, and S70, which are related to a first period of time P1, a second period of time P2, a third period of time P3, a fourth period of time P4, a fifth period of time P5, a sixth period of time P6, a seventh period of time P7, respectively.

First, the dynamic regulation process of the dynamic regulation power controller 10 performs the step S10 by linearly increasing the driving voltage VD from 0V to a conduction voltage VGS during the first period of time P1, wherein the conduction voltage VGS is larger than a threshold voltage VTH of the switch unit 20 and particularly close to a Miller plateau voltage of the switch unit 20. When the driving voltage VD exceeds the threshold voltage VTH, the switch unit 20 starts to be turned on, and the driving current IDS flowing through the switch unit 20 is gradually increased from 0 A to a maximum driving current IDRV as the driving voltage VD being increased. The maximum driving current IDRV is adjusted according to the feedback voltage VCOM corresponding to the input AC voltage VAC and the output power VOUT, and the output power VOUT is related to the loading state. For example, the maximum driving current IDRV is increased as the input AC voltage VAC is increased (that is, enhancing the conduction level of the switch unit 20), and the maximum driving current IDRV is decreased as the feedback voltage VCOM is increased (that is, reducing the conduction level of the switch unit 20).

Then, the step S20 is executed by keeping the driving voltage VD at the conduction voltage VGS, and at the same time, keeping the driving current IDS at the maximum driving current IDRV during the second period of time P2. Next, the step S30 is performed by increasing the driving voltage VD from the conduction voltage VGS to a high level voltage VDRV, and at the same time, keeping the driving current IDS at the maximum driving current IDRV during the third period of time P3.

It should be noted that the dynamic regulation process sets the high level voltage VDRV to increase as the feedback voltage VCOM is increased. That is, the high level voltage VDRV is increased as the input AC voltage VAC increases. Accordingly, the dynamic regulation process controls the maximum driving current IDRV to increase as the input AC voltage VAC increases so as to enhance the driving force for the load RO, thereby increasing efficiency of power conversion.

In other words, the present invention dynamically adjusts the maximum driving current IDRV and the high level voltage VDRV not only based on the loading state but also the input AC voltage VAC. For instance, the maximum driving current IDRV and the high level voltage VDRV are different if the input AC voltage VAC varies like 90-264 Vac.

Subsequently, the dynamic regulation process enters the step S40, which keeps the driving voltage VD at the high level voltage VH, and at the same time, keeps the driving current IDS at the maximum driving current IDRV during the fourth period of time P4. The step S50 is then performed by decreasing the driving voltage VD from the high level voltage VH to the conduction voltage VGS, and at the same time, keeping the driving current IDS at the maximum driving current IDRV during the fifth period of time P5.

In the step 60, the dynamic regulation process decreases the driving voltage VD from the conduction voltage VGS to 0V during the sixth period of time P6, and the switch unit 20 is turned off and the driving current IDS is decreased to 0 A when the driving voltage VD is less than the threshold voltage VTH. Then, the step S70 is performed by keeping the driving voltage VD to 0V to maintain the switch unit 20 turned off, at the same time, keeping the driving current IDS to 0 A during the seventh period of time P7, and then returning back to the step 10, thereby implementing a PWM control as desired.

Figure 4:
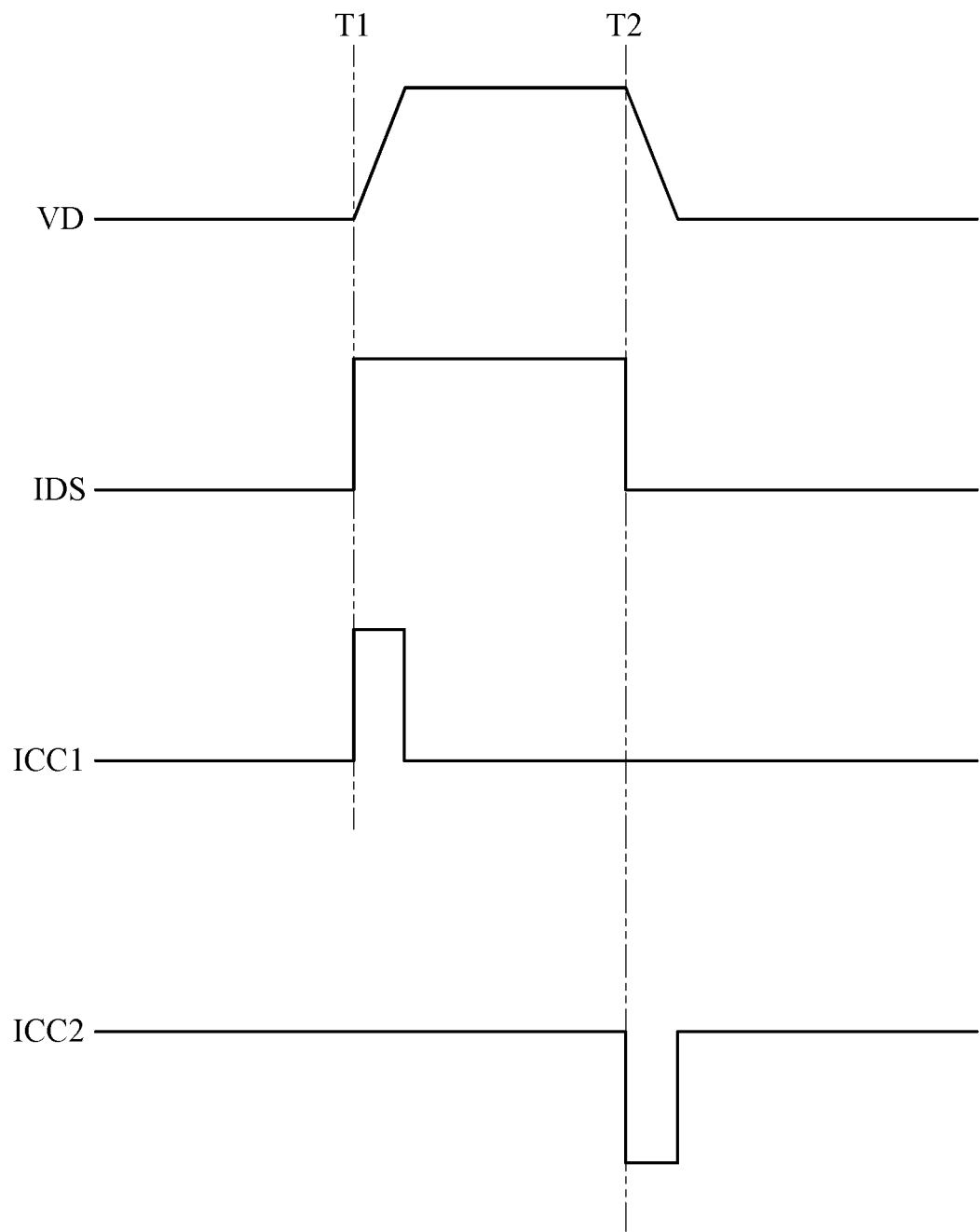
FIG. 4 shows a waveform of the driving voltage of the dynamic regulation power controller according to the embodiment of the present invention.

To further explain the operation of the first constant current source CC1 and the second constant current source CC2, please refer to FIG. 4. As shown in FIG. 4, the waveform of the driving voltage VD is simplified to just represent the turn-on state and the turn-off state of the switch unit 20. In other words, the time T1 indicates when the switch unit 20 starts to be turned on, and the time T2 indicates when the switch unit 20 starts to be turned off. The driving current IDS comprises the first constant current ICC1 and the second constant current ICC2. Specifically, the first constant current ICC1 only occurs at the transient period when the switch unit 20 starts to be turned on, and the second constant current ICC2 only occurs at the transient period when the switch unit 20 starts to be turned off. Particularly, the dynamic regulation process of the present invention dynamically adjusts the first constant current ICC1 and the second constant current ICC2 based on the feedback voltage VCOM so as to improve efficiency of power conversion.

From the above mentioned, one of the features provided by the present invention is that the switching unit, the input power processing unit, the transformer, the current sensing resistor, the power regulation unit, the output rectification unit, and the output capacitor are in collocation with the dynamic regulation power controller, the work voltage input pin, the feedback voltage input pin, the current sensing input pin, and the regulation power input pin are employed to receives the work voltage, the feedback voltage, the current sensing signal, and the input regulation power, respectively, and the driving voltage output pin is configured to send the driving voltage for driving the switch unit connected to the driving voltage output pin so as to convert the input AC voltage into the output voltage for supplying the load. In particular, the driving voltage is generated and dynamically adjusted according to the feedback voltage and the current sensing signal, and the driving current is dynamically adjusted according to the feedback voltage and the input AC voltage, thereby greatly increasing efficiency of power conversion and improving EMI.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A dynamic regulation power controller in collocation with a switching unit, an input power processing unit, a transformer, a current sensing resistor, a power regulation unit, an output rectification unit, and an output capacitor for performing a dynamic regulation process to generate a driving voltage and control a driving current corresponding to the driving voltage based on an input alternative current (AC) voltage and a feedback voltage, the dynamic regulation power controller comprising:

a work voltage input pin for receiving a work voltage to supply the dynamic regulation power controller for operation;

a feedback voltage input pin for receiving the feedback voltage for the dynamic regulation process;

a driving voltage output pin for sending the driving voltage to the switch unit;

a current sensing input pin for receiving a current sensing signal; and a regulation power input pin for receiving an input regulation power, wherein the input power processing unit receives the input AC voltage and performs a filter process to generate an input voltage, the input voltage is regulated to generate the working voltage, the power regulation unit is connected to the input power processing unit and the regulation power input pin for regulating the input voltage into the input regulation power, the transformer comprises a primary side coil and a secondary side coil, a conduction current and a sensing current flowing through the primary side coil and the secondary side coil, respectively, the sensing current being generated by the secondary side coil through electromagnetic interaction with the conduction current, the secondary side coil, the output rectification unit, and the output capacitor are sequentially connected in series, a load connected in parallel to the output capacitor, the sensing current flows from the secondary side coil to the output capacitor and the load connected in parallel through the output rectification unit, the output capacitor generates an output power to supply the load, the feedback voltage is generated by a primary side feedback circuit or a secondary side feedback circuit, and corresponds to the input AC voltage or the output power, the primary side feedback circuit is connected to the input AC voltage and the feedback voltage pin, the secondary side feedback circuit is connected to the output power and the feedback voltage pin, the input power processing unit, the primary side coil, the switching unit, and the current sensing resistor are sequentially connected in series between the input AC voltage and a ground level, the driving voltage is implemented by a Pulse Width Modulation (PWM) pulse wave provided with a frequency, and the dynamic regulation process comprises:

a step S10, linearly increasing the driving voltage from 0V to a conduction voltage during a first period of time, the conduction voltage being larger than a threshold voltage of the switch unit and close to a Miller plateau voltage of the switch unit, the switch unit being turned on in case of the driving voltage greater than the threshold voltage, gradually increasing the driving current flowing through the switch unit from 0 A to a maximum driving current as the driving voltage being increased, the maximum driving current adjusted according to the feedback voltage;

a step S20, keeping the driving voltage at the conduction voltage and keeping the driving current at the maximum driving current during a second period of time;

a step S30, increasing the driving voltage from the conduction voltage to a high level voltage and keeping the driving current at the maximum driving current during a third period of time, the high level voltage being set to increase as the feedback voltage increasing;

a step S40, keeping the driving voltage at the high level voltage and keeping the driving current at the maximum driving current during a fourth period of time;

a step S50, decreasing the driving voltage from the high level voltage to the conduction voltage and keeping the driving current at the maximum driving current during a fifth period of time;

a step S60, decreasing the driving voltage from the conduction voltage to 0V during a sixth period of time, the switch unit being turned off and the driving current being decreased to 0 A when the driving voltage less than the threshold voltage; and a step S70, keeping the driving voltage to 0V to maintain the switch unit turned off, and keeping the driving current to 0 A during a seventh period of time, and then returning back to the step 10 to implement a PWM control.

2. The dynamic regulation power controller as claimed in claim 1, wherein the switching unit comprises a Metal-Oxide-Semiconductor (MOS) element or a bipolar element.

3. The dynamic regulation power controller as claimed in claim 1, wherein the frequency of the driving voltage is 20 KHz-1 MH.

4. The dynamic regulation power controller as claimed in claim 1, wherein the input AC voltage is 90-264 Vac.

5. The dynamic regulation power controller as claimed in claim 1, further comprising a current source employed to dynamically control the driving current based on the input AC voltage and the feedback voltage through a constant current driving manner, wherein the current source comprises a first current source and a second current source connected in series between the regulation power input pin and the ground level, the first current source receives the input regulation power from the regulation power input pin, a connection point of the first current source and the second current source is connected to the driving voltage output pin, the first current source supplies a first constant current, the second current source supplies a second constant current, the first constant current flows from the input regulation power to the switch unit, and the second constant current flows from the switch unit to the ground level.

* * * * *